United States Patent
Vivanco (10) Patent No.: US 9,439,195 B1
(45) Date of Patent: Sep. 6, 2016

(54) SYSTEMS AND METHODS FOR MANAGING COMMUNICATION OF AN ACCESS NODE AND A RELAY NODE

(71) Applicant: Sprint Spectrum LP, Overland Park, KS (US)

(72) Inventor: Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 96 days.

(21) Appl. No.: 14/329,252

(22) Filed: Jul. 11, 2014

(51) Int. Cl.
*H04W 72/04* (2009.01)
*H04B 7/15* (2006.01)

(52) U.S. Cl.
CPC .......... *H04W 72/0453* (2013.01); *H04B 7/15* (2013.01)

(58) Field of Classification Search
None
See application file for complete search history.

(56) References Cited

U.S. PATENT DOCUMENTS

| | | | |
|---|---|---|---|
| 9,014,205 B2* | 4/2015 | Schmidl | H04L 1/0026 370/437 |
| 9,191,098 B2* | 11/2015 | Kazmi | H04B 7/15542 |
| 2011/0110345 A1* | 5/2011 | Heidari et al. | H04W 40/60 370/338 |
| 2013/0021962 A1 | 1/2013 | Hu et al. | |

* cited by examiner

*Primary Examiner* — Anh Ngoc Nguyen (57) ABSTRACT

Systems and methods are described for managing communications of an access node and a relay node. A utilization of a first frequency band that is used for communication between a relay node and wireless devices may be monitored. The relay node may also communicate with an access node to connect to a network. It may be determined that the monitored utilization meets a utilization criteria. One of a second frequency band and a third frequency band may be selected for the relay node based on the determination that the monitored utilization meets the utilization criteria. The selected frequency band may be allocated for communication between the relay node and wireless devices.

16 Claims, 8 Drawing Sheets

SYSTEMS AND METHODS FOR MANAGING COMMUNICATION OF AN ACCESS NODE AND A RELAY NODE

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load (e.g., load above a threshold). For example, a communication link may experience large amount of data traffic. Here, the efficiency of the system may suffer due to excessive load on a portion of the system. Accordingly, a system that effectively balances load may be able to provide a high quality service to users of the system.

OVERVIEW

Systems and methods are described for managing communication of an access node and a relay node. A utilization of a first frequency band that is used for communication between a relay node and wireless devices may be monitored. The relay node may also communicate with an access node to connect to a network. It may be determined that the monitored utilization meets a utilization criteria. One of a second frequency band and a third frequency band may be selected for the relay node based on the determination that the monitored utilization meets the utilization criteria. The selected frequency band may be allocated for communication between the relay node and wireless devices.

DETAILED DESCRIPTION

Figure 1:
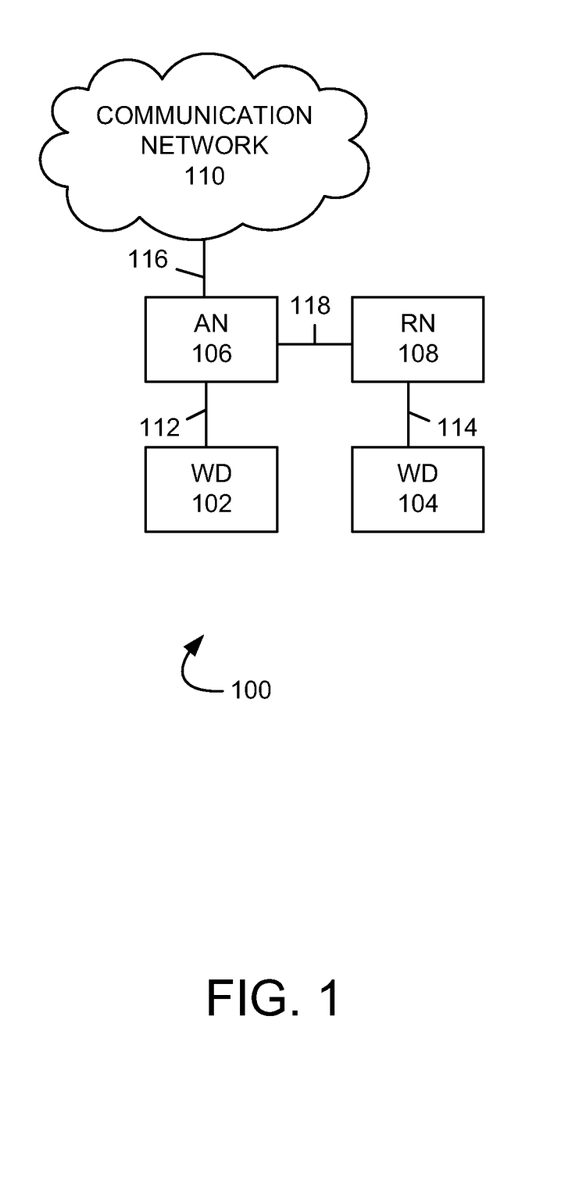
FIG. 1 illustrates an exemplary communication system to manage communications of an access node and a relay node.

FIG. 1 illustrates an exemplary communication system 100 to manage communications of an access node and a relay node comprising wireless devices 102 and 104, access node 106, relay node 108, communication network 110, and communication links 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 106, relay node 108, and communication network 110 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access node 106 and relay node 108, any number of wireless devices can be implemented.

Access node 106 and relay node 108 are network nodes capable of providing wireless communications to wireless devices 102 and 104, and can be, for example, a base transceiver station, a radio base station, an eNodeB device, or an enhanced eNodeB device. In an embodiment, access node 106 may comprise a macro cell while relay node 108 may comprise a small cell (e.g., femto cell, pico cell, micro cell, or the like) such that the coverage radius (e.g., the radius around each node where a wireless device may detect wireless signals transmitted from the node at a signal level above a threshold) for the macro cell is larger than the coverage radius for the small cell. As such, a macro cell may transmit wireless signals with a greater signal level (e.g., use a higher transmission power) than a small cell. Access node 106 may communicate with communication network 110 over communication link 116. Relay node 108 may communicate with communication network 110 via access node 106 or using a separate communication link (not illustrated). Access node 106 and relay node 108 may also communicate directly with each other over communication link 118.

Although only access node 106 and relay node 108 are illustrated in FIG. 1, wireless devices 102 and 104 can be in communication with a plurality of access nodes and/or relay nodes. The plurality of access nodes and/or relay nodes can be associated with different networks and can support different communication protocols and radio access technologies.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116, and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
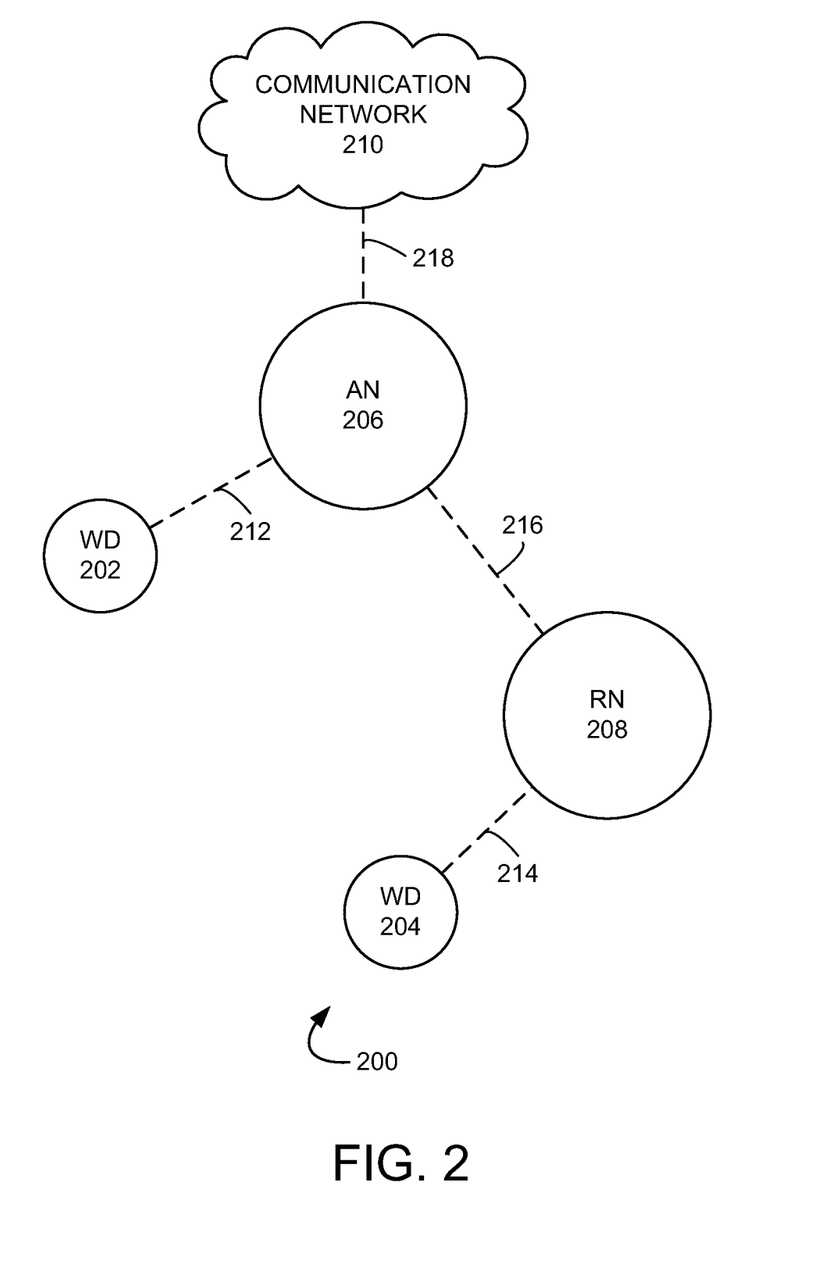
FIG. 2 illustrates another exemplary system to manage communications of an access node and a relay node.

FIG. 2 illustrates an exemplary communication system 200 for managing communications of an access node and a relay node. System 200 comprises wireless devices 202 and 204, access node 206, relay node 208, communication network 210, and communication links 212, 214, 216 and 218. Wireless devices 202 and 204 may comprise devices similar to wireless devices 102 and 104. Access node 206 may comprise an access node similar to access node 106 and relay node 208 may comprise a relay node similar to relay node 108. Communication network 210 may comprise a network similar to communication network 110. Communication links 212, 214, 216 and 218 may comprise links similar to communication links 112, 114, 116, and 118 of FIG. 1.

In operation, access node 206 may establish communication with wireless device 202 such that access node 202 provides the wireless device access to a communication network (e.g., communication network 210). Similarly, relay node 208 may establish communication with wireless device 204 such that relay node 208 provides the wireless device access to a communication network (e.g., communication network 210).

In an embodiment, access node 206 may comprise a macro cell and relay node 208 may comprise a small cell (e.g., femto cell, pico cell, micro cell, or the like). For instance, the coverage radius for the macro cell may be larger than the coverage radius for the small cell. In this example, relay node 208 may communicate with access node 206 in order to communicate with a communication network (e.g., communication network 210).

For example, access node 206 may be in communication with communication network 210 such that communication network 210 provides wireless services for wireless devices 202 and 204. Communication network 210 may comprise a core network that includes, for example, a controller node, a gateway node, and any other suitable network elements. The core network may perform functions in order to provide wireless service for wireless devices 202 and 204. For example, an element of the core network (e.g., a controller node) may instruct network elements to establish a data bearer for wireless device 202. Accordingly, a data bearer may be established throughout the core network such that data may be transmitted to and from wireless device 202 over the established data bearer. In another example, an element of the core network (e.g., a gateway node) may enable wireless device 202 to communicate with an external data network (e.g., the Internet). Here, data may be communicated between a gateway node and wireless device 202 such that wireless device 202 may communicate with the external network (e.g., the Internet).

In an embodiment, relay node 208 may communicate with communication network 210 using access node 206. For example, relay node 208 may transmit data to access node 206 such that the transmitted data is used to enable wireless device 204 to access an external network (e.g., the Internet) or to enable wireless device 204 to use services provided by the core network (e.g., voice services). Here, communication link 216 may be used to communicate data between access node 206 and relay node 208. Access node 206 may then transmit the data to and from communication network 210 (e.g., over communication link 218). In an embodiment, relay node 208 may be in direct communication with communication network 210 (e.g., using a communication link not depicted). Here, relay node 208 and communication network 210 may directly communicate for a first portion of traffic between the network elements and my use access node 206 for a second portion of traffic between the network elements. In another embodiment, relay node 208 may be in communication with a second access node (not depicted). Here, relay node 208 and communication network 210 may communicate using access node 206 for a first portion of traffic between the network elements and my communicate using the second access node for a second portion of traffic between the network elements.

In an embodiment, access node 206 and relay node 208 may communicate over the air (e.g., communication link 216 may comprise a wireless communication link). For example, a plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an example that implements a particular protocol, a system having a channel band of 5 MHz can comprise 300 subcarriers per unit of time, a system having a channel band of 10 MHz can comprise 600 subcarriers per unit of time, and a system having a channel band of 15 MHz can comprise 900 subcarriers per unit of time.

In an embodiment, system 200 may use a plurality of carriers in order to provide wireless communication services. A frequency band may comprise a carrier, a channel, a plurality of any of these, or any other suitable frequency band. Accordingly, a frequency band from a set of frequency bands may be used for communication between access node 206 and relay node 208. In addition, the set of frequency bands may be used for other wireless communication (e.g., communication between access node 206 and wireless devices in communication with access node 206, communication between relay node 208 and wireless devices in communication with relay node 208, and the like). A system that efficiently allocates wireless spectrum to access node 206 and relay node 208 may provide enhanced services to wireless devices using communication system 200.

Systems and methods are described for managing communications of an access node and a relay node. A utilization of a first frequency band that is used for communication between a relay node and wireless devices may be monitored. The relay node may also communicate with an access node to connect to a network. It may be determined that the monitored utilization meets a utilization criteria. One of a second frequency band and a third frequency band may be selected for the relay node based on the determination that the monitored utilization meets the utilization criteria. The selected frequency band may be allocated for communication between the relay node and wireless devices.

Figure 3:
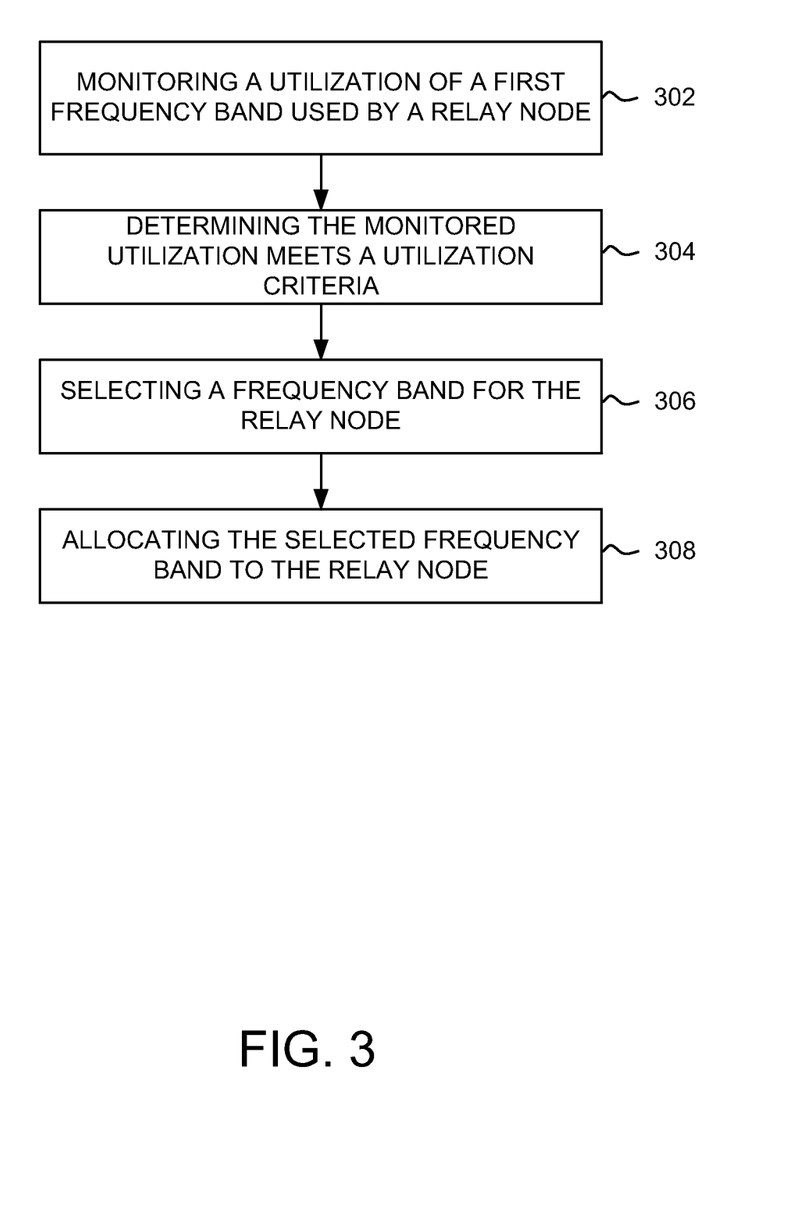
FIG. 3 illustrates an exemplary method of managing communications of an access node and a relay node.

FIG. 3 illustrates an exemplary method for managing communications of an access node and a relay node. The method will be discussed with reference to the exemplary communication system 200 illustrated in FIG. 2, however, the method can be implemented with any suitable communication system.

Referring to FIG. 3, at step 302, a utilization of a first frequency band that is used for communication between a relay node and wireless devices may be monitored. For example, relay node 208 may be capable of communicating with network elements (e.g., wireless devices, access nodes, and the like) over a set of frequency bands. Relay node 208 may communicate with wireless devices (e.g., wireless device 204) over a first frequency band. For example, relay node 208 may be instructed to communicate with wireless devices over the first frequency band. In an embodiment, relay node 208 may connect to a network (e.g., network 210) using access node 206. For example, relay node 208 may communicate with access node 206 in order to provide wireless services (e.g., voice services, data services, and the like) for wireless devices (e.g., wireless device 204).

In an embodiment, the utilization of the first frequency band may comprise a number of subcarriers within the first frequency band being used for communication with wireless devices, a number of subframes within the first frequency band being used for communication with wireless devices, a number of connections using the first frequency band (e.g., a number of RRC connections), a data rate over the first frequency band (e.g., actual data rate per capacity data rate), a throughput over the first frequency band, and the like.

At step 304, it may be determined that a utilization of the first frequency band meets a criteria. For example, relay node 208 may communicate with wireless devices (e.g., wireless device 204) over the first frequency band. The monitored utilization may be compared to a utilization criteria (e.g., threshold number of subcarriers used for data communication, threshold number of subframes allocated for data communication, threshold number of RRC connections, threshold data rate, threshold throughput, and the like), and it may be determined that the utilization meets the utilization criteria.

At step 306, one of a second frequency band and a third frequency band may be selected for the relay node based on the determination that the utilization meets the utilization criteria. For example, one of a second frequency band and a third frequency band may be selected for relay node 208 based on the determination that the utilization of the first frequency band (e.g., by relay node 208) meets the utilization criteria.

At step 308, the selected frequency band may be allocated for communication between the relay node and wireless devices. For example, one of the second frequency band and the third frequency band may be selected for relay node 208, and the selected frequency band may be allocated for communication between relay node 208 and wireless devices (e.g., wireless device 204). In an embodiment, allocation may comprise intra-frequency handover (e.g., for wireless devices communicating with relay node 208) and access restriction to the allocated frequency band (e.g., instructions to relay node 208 and to wireless devices in communication with relay node 208 that restrict communications between these network elements to the selected frequency band).

Figure 4:
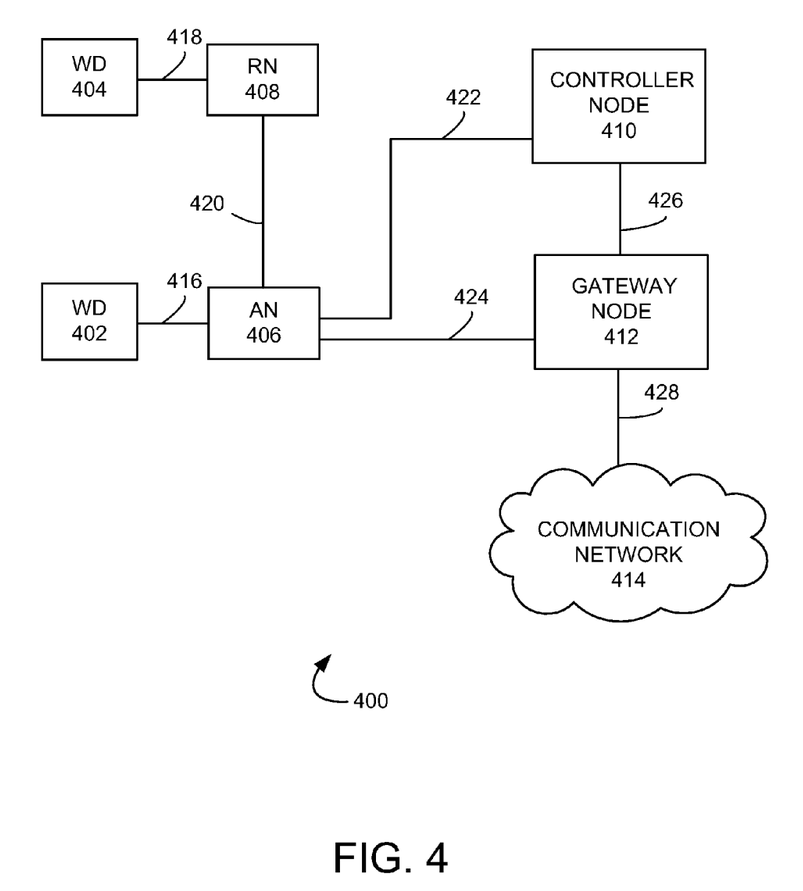
FIG. 4 illustrates another exemplary system to manage communications of an access node and a relay node.

FIG. 4 illustrates another exemplary communication system 400 to manage communications of an access node and a relay node. Communication system 400 may comprise wireless devices 402 and 404, access node 406, relay node 408, controller node 410, gateway node 412, communication network 414, and communication links 416, 418, 420, 422, 424, 426, and 428. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402 and 404 can be any device configured to communicate over communication system 400 using a wireless communication link. For example, wireless devices 402 and 404 can include a cell phone, a smart phone, a computing platform such as a laptop, palmtop, or a tablet, a personal digital assistant, or an internet access device, and combinations thereof.

Access node 406 and relay node 408 are network nodes capable of providing wireless communications to wireless devices 402 and 404, and can be, for example, a base transceiver station, a radio base station, an eNodeB device, or an enhanced eNodeB device. In an embodiment, access node 406 may comprise a macro cell while relay node 408 may comprise a small cell (e.g., femto cell, pico cell, micro cell, or the like) such that the coverage radius (e.g., the radius around each node where a wireless device may detect wireless signals transmitted from the node at a signal level above a threshold) for the macro cell is larger than the coverage radius for the small cell. As such, a macro cell may transmit wireless signals with a greater signal level (e.g., use a higher transmission power) than a small cell. In an embodiment, access node 406 can comprise a serving access node for wireless device 402 and rely node 408 can comprise a serving access node for wireless device 404. Access node 406 may communicate with controller node 410 over communication link 422 and with gateway node 412 over communication link 424. Access node 406 and relay node 408 may also communicate directly with each other over communication link 420. In an embodiment, rely node 408 can communicate directly with controller node 410 and gateway node 412 over communication links (not depicted).

Controller node 410 can be any network node configured to manage services within system 400. Controller node 410 may provide other control and management functions for system 400. The controller node 410 can be a single device having various functions or a plurality of devices having differing functions. For example, controller node 410 can include at least one of a multi-cell/multicast coordination entity (MCE), a mobility management entity (MME), a radio network controller (RNC), a mobile switching center (MSC), and a combination thereof.

Controller node 410 can comprise a processor and associated circuitry to execute or direct the execution of computer-readable instructions to obtain information. Controller node 410 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 410 can receive instructions and other input at a user interface. Controller node 410 can comprise a processor and associated circuitry to execute or direct the execution of computer-readable instructions to obtain information.

Gateway node 412 is a network element which can comprise a processor and associated circuitry to execute or direct the execution of computer-readable instructions. Gateway node 412 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 412 can provide instructions to access node 406 and relay node 408 related to channel selection in communications with wireless devices 402 and 404. For example, gateway node 412 can comprise at least one of a serving gateway (SGW), a packet data network gateway (PDNGW), a cellular gateway (CGW), and a combination thereof.

Communication network 414 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 414 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 414 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 416, 418, 420, 422, 424, 426, and 428 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 406 and relay node 408, controller node 410, gateway node 412, and communication network 414 which are omitted for clarity, including additional processing nodes, routers, gateways, and physical and/or wireless data links for carrying data among the various network elements.

Figure 5:
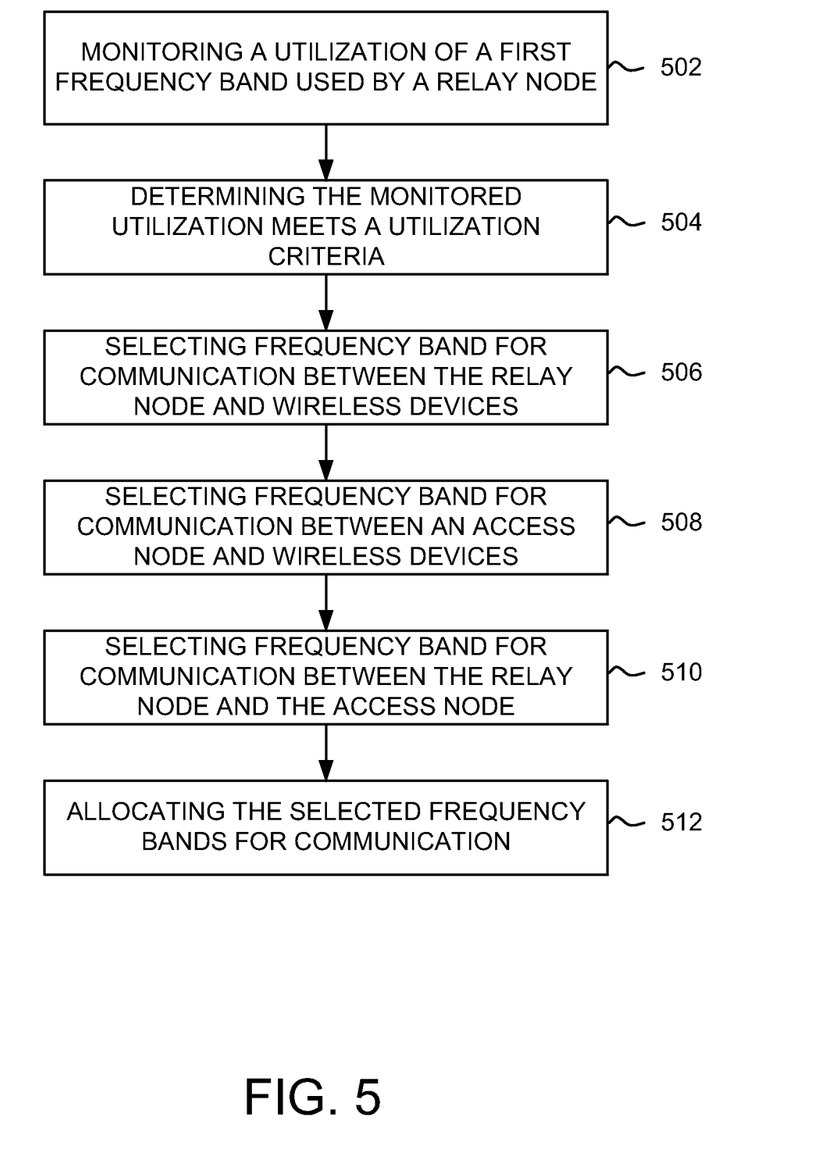
FIG. 5 illustrates another exemplary method of managing communications of an access node and a relay node.
Figure 6:
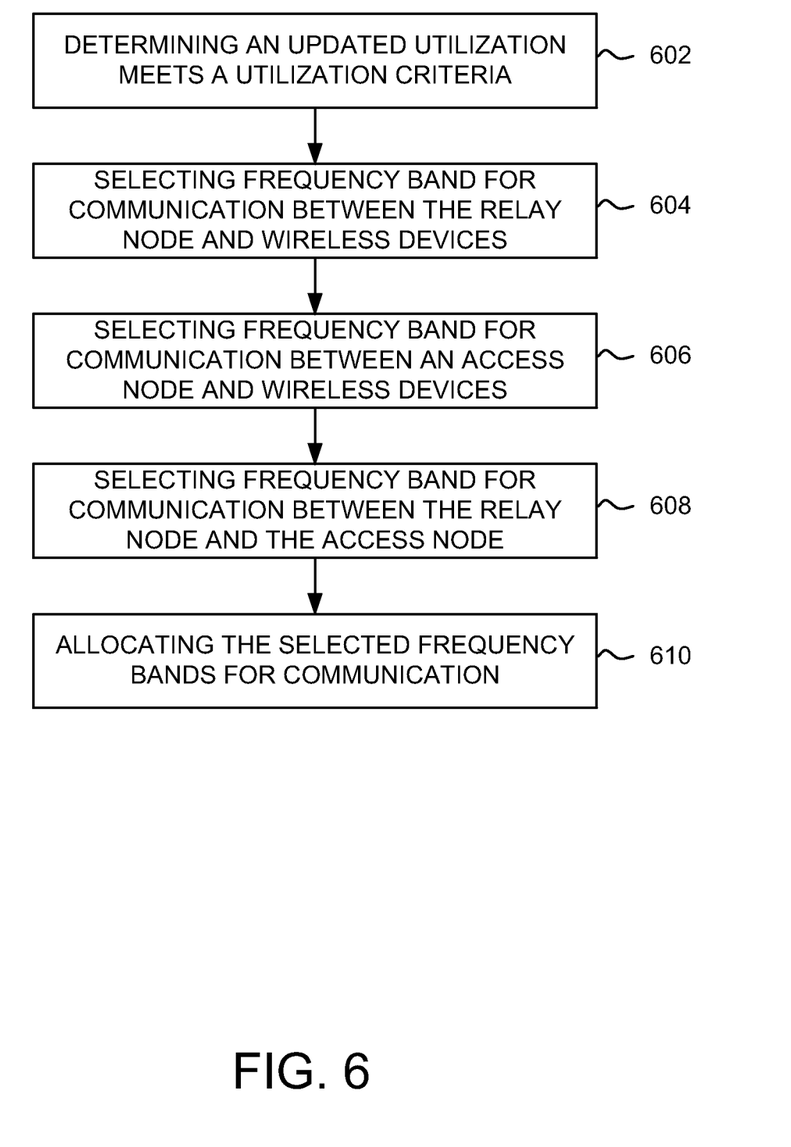
FIG. 6 illustrates another exemplary method of managing communications of an access node and a relay node.

In an embodiment, any of controller node 410, gateway node 412, one or more modules of access node 406, and one or more modules of relay node 408 may perform all or parts of the methods of FIGS. 3, 5, and 6.

In operation, access node 406 may establish communication with wireless device 402 such that access node 406 provides the wireless device access to a communication network (e.g., communication network 414). Similarly, relay node 408 may establish communication with wireless device 404 such that relay node 408 provides the wireless device access to a communication network (e.g., communication network 414).

In an embodiment, access node 406 may comprise a macro cell and relay node 408 may comprise a small cell (e.g., femto cell, pico cell, micro cell, or the like). For instance, the coverage radius for the macro cell may be larger than the coverage radius for the small cell. In this example, relay node 408 may communicate with access node 406 in order to communicate with controller node 410, gateway node 412, or communication network 414.

For example, access node 406 may be in communication with controller node 410, gateway node 412, or communication network 414 in order to provide wireless services for wireless devices 402 and 404. Controller node 410, gateway node 412, or communication network 414 may comprise a core network that may perform functions in order to provide wireless service for wireless devices 402 and 404. For example, an element of the core network (e.g., controller node 410) may instruct network elements to establish a data bearer for wireless device 402. Accordingly, a data bearer may be established throughout the core network such that data may be transmitted to and from wireless device 402 over the established data bearer. In another example, an element of the core network (e.g., gateway node 412) may enable wireless device 402 to communicate with an external data network (e.g., the Internet). Here, data may be communicated between gateway node 412 and wireless device 402 such that wireless device 402 may communicate with the external network (e.g., the Internet).

In an embodiment, relay node 408 may communicate with controller node 410, gateway node 412, or communication network 414 using access node 406. For example, relay node 408 may transmit data to access node 406 such that the transmitted data is used to enable wireless device 404 to access an external network (e.g., the Internet) or to enable wireless device 404 to use services provided by the core network (e.g., voice services). Here, communication link 420 may be used to communicate data between access node 406 and relay node 408. Access node 406 may then transmit the data to and from controller node 410, gateway node 412, or communication network 414. In an embodiment, relay node 408 may be in direct communication with controller node 410, gateway node 412, or communication network 414 (e.g., using communication links not depicted). Here, relay node 408 may directly communicate with one of controller node 410, gateway node 412, or communication network 414 for a first portion of traffic between the network elements and my use access node 406 for a second portion of traffic between the network elements. In another embodiment, relay node 408 may be in communication with a second access node (not depicted). Here, relay node 408 may communicate with one of controller node 410, gateway node 412, or communication network 414 using access node 406 for a first portion of traffic between the network elements and my communicate using the second access node for a second portion of traffic between the network elements.

In an embodiment, access node 406 and relay node 408 may communicate over the air (e.g., communication link 420 may comprise a wireless communication link). Accordingly, a frequency band from a set of frequency bands may be used for communication between access node 406 and relay node 408. In addition, the set of frequency bands may be used for other wireless communication (e.g., communication between access node 406 and wireless devices in communication with access node 406, communication between relay node 408 and wireless devices in communication with relay node 408, and the like). A system that efficiently allocates wireless spectrum to access node 406 and relay node 408 may provide enhanced services to wireless devices using communication system 400.

FIG. 5 illustrates an exemplary method to manage communications of an access node and a relay node. The method will be discussed with reference to the exemplary communication system 400 illustrated in FIG. 4, however, the method can be implemented with any suitable communication system.

Referring to FIG. 5, at step 502, a utilization of a first frequency band that is used for communication between a relay node and wireless devices may be monitored. For example, relay node 408 may be capable of communicating with network elements (e.g., wireless devices, access nodes, and the like) over a set of frequency bands. Relay node 408 may communicate with wireless devices (e.g., wireless device 404) over a first frequency band. For example, relay node 408 may be instructed to communicate with wireless devices over the first frequency band. In an embodiment, relay node 408 may connect to a network (e.g., network 410) using access node 406. For example, relay node 408 may communicate with access node 406 in order to provide wireless services (e.g., voice services, data services, and the like) for wireless devices (e.g., wireless device 404).

In an embodiment, a utilization of one or more of a first frequency band, second frequency band, and third frequency band may be monitored. For example, the first frequency band, second frequency band, and third frequency band may be used for at least one of communication between relay node 408 and wireless devices, communication between access node 406 and wireless devices, or communication between access node 406 and relay node 408. A utilization of one or a combination of the first frequency band, second frequency band, and third frequency band may be monitored.

In an embodiment, the utilization of the frequency band may comprise a number of subcarriers within the frequency band being used for communication with wireless devices, a number of subframes within the frequency band being used for communication with wireless devices, a number of connections using the frequency band (e.g., a number of RRC connections), a data rate over the frequency band (e.g., actual data rate per capacity data rate), a throughput over the frequency band, and the like.

At step 504, it may be determined that a utilization of the first frequency band meets a criteria. For example, relay node 408 may communicate with wireless devices (e.g., wireless device 404) over the first frequency band. The monitored utilization may be compared to a utilization criteria (e.g., threshold number of subcarriers allocated for data communication, threshold number of subframes allocated for data communication, threshold number of RRC connections, threshold data rate, threshold throughput, and the like), and it may be determined that the utilization meets the utilization criteria.

In an embodiment, it may be determined that a utilization of one or more of a first frequency band, second frequency band, and third frequency band meets the utilization criteria. For example, the first frequency band, second frequency band, and third frequency band may be used for at least one of communication between relay node 408 and wireless devices, communication between access node 406 and wireless devices, or communication between access node 406 and relay node 408. A utilization of one or a combination of the first frequency band, second frequency band, and third frequency band may be determined to meet the utilization criteria.

At step 506, one of a second frequency band and a third frequency band may be selected for the relay node based on the determination that the utilization meets the utilization criteria. For example, one of a second frequency band and a third frequency band may be selected for communication between relay node 408 and wireless devices (e.g., wireless device 404) based on the determination that the utilization of the one or more frequency bands meets the utilization criteria.

At step 508, one of the first frequency band, the second frequency band, and the third frequency band may be selected for the access node based on the determination that the utilization meets the utilization criteria. For example, one of the first frequency band, the second frequency band, and the third frequency band may be selected for communication between access node 406 and wireless devices (e.g., wireless device 402) based on the determination that the utilization of the one or more frequency bands meets the utilization criteria.

At step 510, one of the first frequency band, the second frequency band, and the third frequency band may be selected for the access node and the relay node based on the determination that the utilization meets the utilization criteria. For example, one of the first frequency band, the second frequency band, and the third frequency band may be selected for communication between access node 406 and relay node 408 based on the determination that the utilization of the one or more frequency bands meets the utilization criteria.

In an embodiment, selecting steps 506, 508, and 510 may be based on one or more of a capacity for the frequency bands, the utilization of the frequency bands by the access node and the relay node, and a plurality of rules. For example, a first rule may recite that each of the first frequency band, the second frequency band, and the third frequency band is to be selected for at least one of communication between relay node 408 and wireless devices, communication between access node 406 and wireless devices, or communication between access node 406 and relay node 408. In an embodiment, a second rule may recite that no frequency band will be selected for more than one of communication between relay node 408 and wireless devices, communication between access node 406 and wireless devices, or communication between access node 406 and relay node 408.

In an embodiment, the frequency bands may be selected based on the utilization of the frequency bands by access node 406 and relay node 408 and a capacity of the frequency bands. For example, the utilization of the first frequency band by relay node 408 may meet a utilization criteria (e.g., a utilization over a threshold). Here, the first frequency band may comprise a first capacity (e.g., data rate capacity, throughput capacity, bandwidth, and the like), the second frequency band may comprise a second capacity (e.g., data rate capacity, throughput capacity, bandwidth, and the like), and the third frequency band may comprise a third capacity (e.g., data rate capacity, throughput capacity, bandwidth, and the like), where the second capacity is greater than the first capacity and the third capacity is greater than the second capacity.

Accordingly one of the second frequency band and the third frequency band may be selected for relay node 408 based on the utilization of the first frequency band by relay node 408, the second capacity, and the third capacity. Where it is determined that the second capacity may be sufficient to handle communications between the relay node 408 and wireless device (e.g., determined based on the utilization of the first frequency band by relay node 408), the second frequency band may be selected for the relay node 408. Where it is determined that the second capacity would not be sufficient to handle communications between relay node 408 and wireless devices, but the third capacity would be sufficient to handle communications between relay node 408 and wireless devices, the third frequency band may be selected for the relay node 408. Similarly, frequency bands may be selected for communications between access node 406 and wireless devices and communications between access node 406 and relay node 408, where the selection may be based on the utilization of each frequency band (e.g., the utilization by access node 406 to communicate with wireless devices and the utilization by access node 406 and relay node 408 to communicate with one another), the first capacity, the second capacity, and the third capacity.

In an embodiment, the frequency band selected for communication between access node 406 and relay node 408 may be based on the frequency band selected for communication between relay node 408 and wireless devices. For example, access node 406 and relay node 408 may communicate in order to provide wireless services for wireless device in communication with relay node 408 (e.g., wireless device 404). Accordingly, in this example, the traffic experienced between access node 406 and relay node 408 is directly correlated with the traffic experienced between relay node 408 and wireless devices. Here, a rule may recite that the capacity for the frequency band selected for communication between access node 406 and relay node 408 may be based on one or more of the capacity for the frequency band selected for communication between relay node 408 and wireless devices and the utilization of the frequency band used by relay node 408 to communicate with wireless devices.

At step 512, the selected frequency bands may be allocated for communication. For example, one of the second frequency band and the third frequency band may be selected for relay node 408, and the selected frequency band may be allocated for communication between relay node 408 and wireless devices (e.g., wireless device 404). In addition, one of the first frequency band, second frequency band, and third frequency band may be selected for access node 406, and the selected frequency band may be allocated for communication between access node 406 and wireless devices (e.g., wireless device 402). And one of the first frequency band, second frequency band, and third frequency band may be selected for access node 406 and relay node 408, and the selected frequency band may be allocated for communication between access node 406 and relay node 408.

In an embodiment, allocation may comprise intra-frequency handover (e.g., for wireless devices communicating with access node 406 and/or relay node 408) and access restriction to the allocated frequency band (e.g., instructions to access node 406, relay node 408, and to wireless devices in communication with access node 406 and relay node 408 that restrict communications between these network elements to the selected frequency band). For example, wireless devices in communication with access node 406 (e.g. wireless device 402) may be instructed to perform an intra-frequency handover to the frequency selected for communication between access node 406 and wireless devices. In addition, access node 406 may be restricted to communication using the selected frequency band. In an embodiment, a similar process may be used to allocate the frequency band selected from communication between relay node 408 and wireless devices (e.g., wireless device 404). For the frequency band selected for communication between access node 406 and relay node 408, both access node 406 and rely node 408 may be instructed to communicate over the selected frequency band, however the instructions may limit usage of the frequency band to communications between these network elements.

FIG. 6 illustrates an exemplary method manage communications of an access node and a relay node. The method of FIG. 6 may follow the method of FIG. 5. The method will be discussed with reference to the exemplary communication system 400 illustrated in FIG. 4, however, the method can be implemented with any suitable communication system.

Referring to FIG. 6, at step 602, it may be determined that an updated utilization of a frequency band meets a utilization criteria. For example, an updated utilization of a selected frequency band that is used for communication between relay node 408 and wireless devices (e.g., wireless device 404) may be monitored. In an embodiment, a first frequency band, a second frequency band, and a third frequency band may be allocated for communication for at least one of communication between relay node 408 and wireless devices, communication between access node 406 and wireless devices, or communication between access node 406 and relay node 408 using, for example, the method of FIG. 5. A utilization of one or more of the first frequency band, second frequency band, and third frequency band may be monitored such that an updated utilization for one or more of the frequency bands is determined. Here, sometime after the frequency bands have been allocated using the method of FIG. 5 (e.g., a predetermined period of time after), an updated utilization of the frequency bands by access node 406, relay node 408, and wireless devices may be determined.

In an embodiment, it may be determined that an updated utilization of one or more of a first frequency band, second frequency band, and third frequency band meets the utilization criteria. For example, the second frequency band may be allocated for communication between relay node 408 and wireless devices (e.g., wireless device 404), and an updated utilization of the second frequency band by relay node 408 may meet a utilization criteria, as described herein. In another example, the first frequency band may be allocated for communication between access node 406 and wireless devices (e.g., wireless device 402), and an updated utilization of the first frequency band by access node 406 may meet a utilization criteria, as described herein. A combination of these may also be determined, that is an updated utilization of the first frequency band by access node 406 may be determined to meet a utilization criteria and an updated utilization of the second frequency band by relay node 408 may be determined to meet a utilization criteria.

At step 604, one of a first frequency band, a second frequency band, and a third frequency band may be selected for the relay node based on the determination that the updated utilization meets the utilization criteria. For example, one of the first frequency band, second frequency band, and third frequency band may be selected for communication between relay node 408 and wireless devices (e.g., wireless device 404) based on the determination that the updated utilization of the one or more frequency bands meets the utilization criteria.

At step 606, one of the first frequency band, the second frequency band, and the third frequency band may be selected for the access node based on the determination that the updated utilization meets the utilization criteria. For example, one of the first frequency band, the second frequency band, and the third frequency band may be selected for communication between access node 406 and wireless devices (e.g., wireless device 402) based on the determination that the updated utilization of the one or more frequency bands meets the utilization criteria.

At step 608, one of the first frequency band, the second frequency band, and the third frequency band may be selected for the access node and the relay node based on the determination that the updated utilization meets the utilization criteria. For example, one of the first frequency band, the second frequency band, and the third frequency band may be selected for communication between access node 406 and relay node 408 based on the determination that the updated utilization of the one or more frequency bands meets the utilization criteria.

In an embodiment, selecting steps 604, 606, and 608 may be based on one or more of a capacity for the frequency bands, the updated utilization of the frequency bands by the access node and the relay node, and a plurality of rules. For example, the selection of the first frequency band, the second frequency band, and the third frequency band for at least one of communication between relay node 408 and wireless devices, communication between access node 406 and wireless devices, or communication between access node 406 and relay node 408, may follow similar rules to steps 506, 508, and 510. That is, steps 604, 606, and 608 may select frequency bands similar to steps 506, 508, and 510, where the selection may be based on the updated utilization.

At step 610, the selected frequency bands may be allocated for communication. For example, one of the first frequency band, second frequency band and, third frequency band may be selected for relay node 408, and the selected frequency band may be allocated for communication between relay node 408 and wireless devices (e.g., wireless device 404). In addition, one of the first frequency band, second frequency band, and third frequency band may be selected for access node 406, and the selected frequency band may be allocated for communication between access node 406 and wireless devices (e.g., wireless device 402). And one of the first frequency band, second frequency band, and third frequency band may be selected for access node 406 and relay node 408, and the selected frequency band may be allocated for communication between access node 406 and relay node 408.

In an embodiment, allocation may comprise intra-frequency handover (e.g., for wireless devices communicating with access node 406 and/or relay node 408) and access restriction to the allocated frequency band (e.g., instructions to access node 406, relay node 408, and to wireless devices in communication with access node 406 and relay node 408 that restrict communications between these network elements to the selected frequency band). For example, wireless devices in communication with access node 406 (e.g. wireless device 402) may be instructed to perform an intra-frequency handover to the frequency selected for communication between access node 406 and wireless devices. In addition, access node 406 may be restricted to communication using the selected frequency band. In an embodiment, a similar process may be used to allocate the frequency band selected for communication between relay node 408 and wireless devices (e.g., wireless device 404). For the frequency band selected for communication between access node 406 and relay node 408, both access node 406 and rely node 408 may be instructed to communicate over the selected frequency band, however the instructions may limit usage of the frequency band to communications between these network elements.

Figure 7:
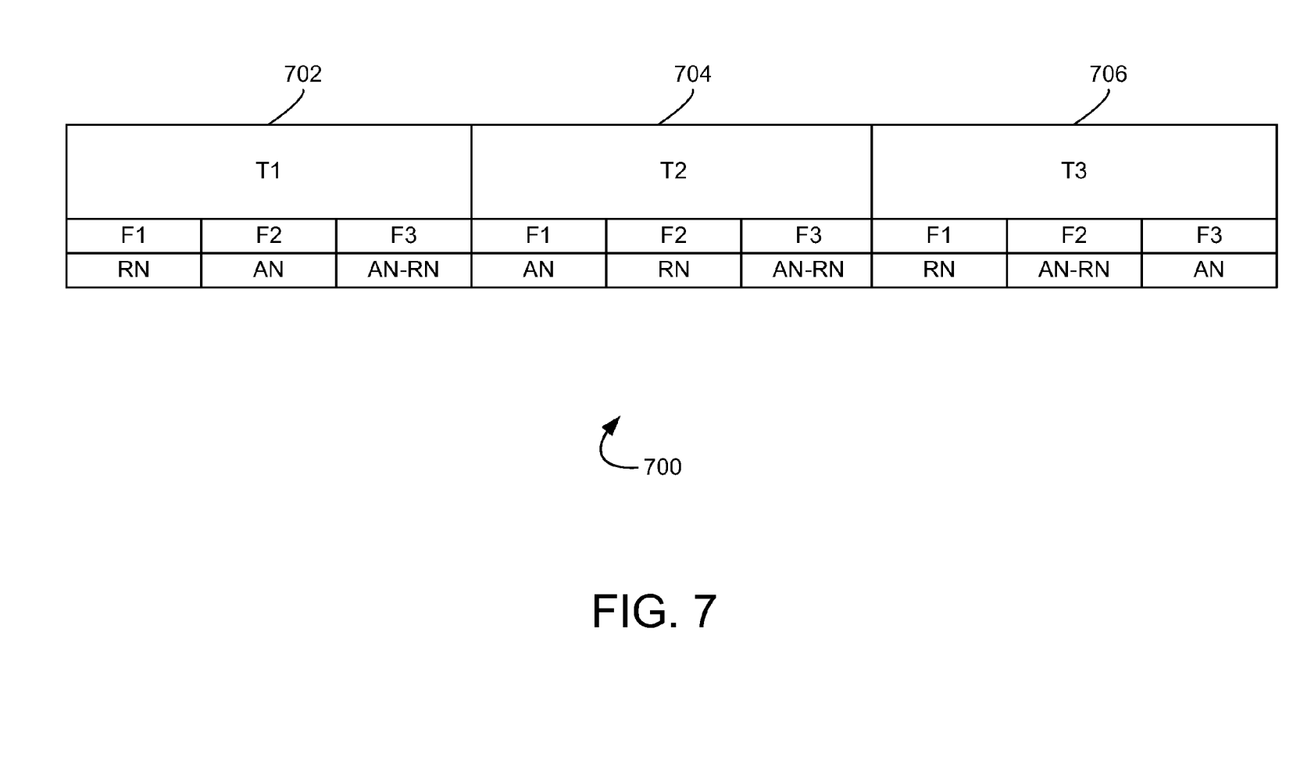
FIG. 7 illustrates an exemplary table used for managing communications of an access node and a relay node.

In an embodiment, the methods of FIGS. 5 and 6 may be performed over a duration of time. For example, continuously or periodically (e.g., based on a predetermined period), the utilization of one or more of the first frequency band, the second frequency band, and the third frequency band may be monitored. When the utilization of one or more of the frequency bands meets a utilization criteria (e.g., at steps 504 and 602) the selections steps (e.g., steps 506, 508 and 510 in FIG. 5 and steps 604, 606, and 608 in FIG. 6) may be performed in order to more efficiently balance load on the network. FIG. 7 illustrates a table that may describe a period of time over which frequency bands are allocated to different network elements using, for example, the methods of FIGS. 5 and 6.

Referring to FIG. 7, column 702 may illustrate a first time period T1, column 704 may illustrates a second time period T2, and column 706 may illustrate a third time period T3. Here, the time periods may be of a predetermined length, of a variable length, or of any suitable duration. For example, the start of time period T1 may illustrates a time where a utilization of one or more of the first frequency band, second frequency band, and third frequency band met a utilization criteria, and the frequency bands were accordingly selected and allocated. Similarly, the start of time period T2 may illustrates a time where an updated utilization of one or more of the first frequency band, second frequency band, and third frequency band met a utilization criteria, and the frequency bands were accordingly re-selected and re-allocated. The start of time period T3 may be similar to those of T1 and T2.

During time period T1, column 702 depicts that the first frequency band was selected and allocated for communication between relay node 408 and wireless devices, the second frequency band was selected and allocated for communication between access node 406 and wireless devices, and the third frequency band was selected and allocated for communication between access node 406 and relay node 408. Then, at the end of time period T1 and the beginning of time period T2, an updated utilization of one or more of the frequency bands met a utilization criteria. Accordingly, the selection and allocation steps (e.g., steps 604, 606, 608, and 610 in FIG. 6) were performed based on the updated utilization. Here, column 704 depicts that the first frequency band was selected and allocated for communication between access node 406 and wireless devices, the second frequency band was selected and allocated for communication relay node 408 and wireless devices, and the third frequency band was selected and allocated for communication between access node 406 and relay node 408. Accordingly, because access node 406 and relay node 408 have been allocated new frequency bands, during the allocation step intra-frequency handovers and access restrictions, as described herein, may have been performed for access node 406, relay node 408, and wireless devices in communication with these network elements.

Then, at the end of time period T2 and the beginning of time period T3, an updated utilization of one or more of the frequency bands met a utilization criteria. Accordingly, the selection and allocation steps (e.g., steps 604, 606, 608, and 610 in FIG. 6) were performed based on the updated utilization. Here, column 706 depicts that the first frequency band was selected and allocated for communication between relay node 408 and wireless devices, the second frequency band was selected and allocated for communication between access node 406 and relay node 408, and the third frequency band was selected and allocated for communication between access node 406 and wireless devices. Accordingly, because access node 406 and relay node 408 have been allocated new frequency bands, during the allocation step intra-frequency handovers and access restrictions, as described herein, may have been performed for access node 406, relay node 408, and wireless devices in communication with these network elements.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 8:
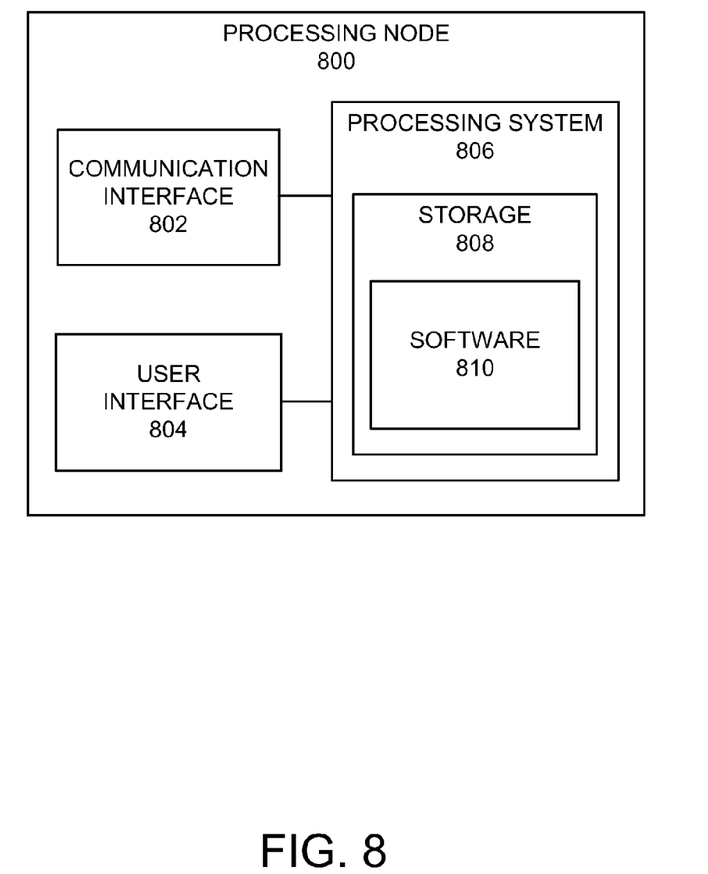
FIG. 8 illustrates an exemplary processing node.

FIG. 8 illustrates an exemplary processing node 800 in a communication system. Processing node 800 comprises communication interface 802, user interface 804, and processing system 806 in communication with communication interface 802 and user interface 804. Processing node 800 can be configured to determine a communication access node for a wireless device. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. Software 810 may include computer programs, firmware, or some other form of machine-readable instructions, including an operating system, utilities, drivers, network interfaces, applications, or some other type of software. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

Examples of processing node 800 include controller node 410 and gateway node 412. Processing node 800 can also be an adjunct or component of a network element, such as an element of access nodes 106 or 406, an element of relay nodes 108 or 408, and the like. Processing node 800 can also be another network element in a communication system. Further, the functionality of processing node 800 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for managing frequency bands at access nodes, the method comprising:
   monitoring a utilization of a first frequency band that is used for communication between a relay node and wireless devices, wherein the relay node communicates with an access node to connect to a network;
   determining that the monitored utilization meets a utilization criteria;
   selecting at least one of a second frequency band and a third frequency band for the relay node based on the determination that the monitored utilization meets the utilization criteria, a capacity of the first frequency band, a capacity of the second frequency band, and a capacity of the third frequency band; and
   allocating the selected frequency band for communication between the relay node and wireless devices.

2. The method of claim 1, further comprising: selecting at least one of the second frequency band and the third frequency band for the relay node and at least one of the first frequency band, the second frequency band, and the third frequency band for the access node based on the monitored utilization meeting a utilization criteria, wherein a frequency band that is selected for the relay node is not selected for the access node; allocating at least one frequency band selected for the relay node for communication between the relay node and wireless devices; and allocating at least one frequency band selected for the access node for communication between the access node and wireless devices.

3. The method of claim 2, further comprising: allocating one of the first frequency band, the second frequency band, and the third frequency band for communication between the access node and the relay node, wherein the frequency band allocated for communication between the access node and the relay node is not allocated for communication between the relay node and wireless devices.

4. The method of claim 3, wherein the second frequency band is allocated for communication between the relay node and wireless devices based on the monitored utilization.

5. The method of claim 4, further comprising: allocating the third frequency band for communication between the access node and the relay node.

6. The method of claim 1, wherein all of the first frequency band, the second frequency band, and the third frequency band are allocated for at least one of communication between the relay node and wireless devices, communication between the access node and wireless devices, or communication between the relay node and the access node.

7. The method of claim 1, wherein selecting at least one of the second frequency band and the third frequency band for the relay node is based on a determination that a remaining capacity of the unselected frequency bands is sufficient for communicating between the relay node and the access node when the relay node communicates with wireless devices using the selected frequency band.

8. A system for managing frequency bands at access nodes, the system comprising:
a controller with a process, the controller configured to:
monitor a utilization of a first frequency band that is used for communication between a relay node and wireless devices, wherein the relay node communicates with an access node to connect to a network;
determine that the monitored utilization meets a utilization criteria;
select at least one of a second frequency band and a third frequency band for the relay node based on the determination that the monitored utilization meets the utilization criteria, a capacity of the first frequency band, a capacity of the second frequency band, and a capacity of the third frequency band; and
allocate the selected frequency band for communication between the relay node and wireless devices.

9. The system of claim 8, wherein the controller is further configured to: select at least one of the second frequency band and the third frequency band for the relay node and at least one of the first frequency band, the second frequency band, and the third frequency band for the access node based on the monitored utilization meeting a utilization criteria, wherein a frequency band that is selected for the relay node is not selected for the access node; allocate at least one frequency band selected for the relay node for communication between the relay node and wireless devices; and allocate at least one frequency band selected for the access node for communication between the access node and wireless devices.

10. The system of claim 9, wherein the controller is further configured to: allocating one of the first frequency band, the second frequency band, and the third frequency band for communication between the access node and the relay node, wherein the frequency band allocated for communication between the access node and the relay node is not allocated for communication between the relay node and wireless devices.

11. The system of claim 10, wherein the second frequency band is allocated for communication between the relay node and wireless devices based on the monitored utilization.

12. The system of claim 11, wherein the controller is further configured to: allocate the third frequency band for communication between the access node and the relay node.

13. The system of claim 8, wherein all of the first frequency band, the second frequency band, and the third frequency band are allocated for at least one of communication between the relay node and wireless devices, communication between the access node and wireless devices, or communication between the relay node and the access node.

14. The system of claim 8, wherein selecting at least one of the second frequency band and the third frequency band for the relay node is based on a determination that a remaining capacity of the unselected frequency bands is sufficient for communicating between the relay node and the access node when the relay node communicates with wireless devices using the selected frequency band.

15. A method for managing frequency bands at access nodes, the method comprising:
monitoring a utilization of a first frequency band that is used for communication between a relay node and wireless devices, wherein the relay node communicates with an access node to connect to a network;
determining that the monitored utilization meets a utilization criteria;
selecting at least one of a second frequency band and a third frequency band for the relay node based on the determination that the monitored utilization meets the utilization criteria;
selecting at least one of the first frequency band, the second frequency band, and the third frequency band for the access node based on the monitored utilization meeting a utilization criteria, wherein a frequency band that is selected for the relay node is not selected for the access node;
allocating at least one frequency band selected for the relay node for communication between the relay node and wireless devices; and
allocating at least one frequency band selected for the access node for communication between the access node and wireless devices.

16. The method of claim 15, further comprising: allocating one of the first frequency band, the second frequency band, and the third frequency band for communication between the access node and the relay node, wherein the frequency band allocated for communication between the access node and the relay node is not allocated for communication between the relay node and wireless devices and is not allocated for communication between the access node and wireless devices.

* * * * *